(12) United States Patent
Schmid (10) Patent No.: US 10,626,757 B2
(45) Date of Patent: Apr. 21, 2020

(54) ASSEMBLY AID, CAMSHAFT MODULE, AND METHOD FOR FIXING THE ROTATIONAL POSITION OF ROTATABLY MOUNTED SHAFTS

(71) Applicants: THYSSENKRUPP PRESTA TECCENTER AG, Eschen (LI); thyssenkrupp AG, Essen (DE)

(72) Inventor: Heiko Schmid, Mauren (LI)

(73) Assignees: THYSSENKRUPP PRESTA TECCENTER AG, Eschen (LI); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/317,145

(22) PCT Filed: Jul. 7, 2017

(86) PCT No.: PCT/EP2017/067115
§ 371 (c)(1),
(2) Date: Jan. 11, 2019

(87) PCT Pub. No.: WO2018/011083
PCT Pub. Date: Jan. 18, 2018

(65) Prior Publication Data
US 2019/0301312 A1  Oct. 3, 2019

(30) Foreign Application Priority Data
Jul. 14, 2016 (DE) .................. 10 2016 112 994

(51) Int. Cl.
*F01L 1/047* (2006.01)
*F16H 7/24* (2006.01)
(Continued)

(52) U.S. Cl.
CPC ................ *F01L 1/047* (2013.01); *F16H 7/24* (2013.01); *B25B 27/0035* (2013.01); *F01L 2001/0537* (2013.01); *F01L 2103/02* (2013.01)

(58) Field of Classification Search
CPC ... F01L 1/047; F01L 2001/0471; F01L 1/053; F01L 2001/0537; F01L 1/46; F01L 2103/02
(Continued)

(56) References Cited

U.S. PATENT DOCUMENTS

2003/0084557 A1  5/2003  Whitehead
2008/0146389 A1  6/2008  Sir
(Continued)

FOREIGN PATENT DOCUMENTS

CN  103 831 624 A   6/2014
DE   38 32 812 A    3/1990
(Continued)

OTHER PUBLICATIONS

English Translation of International Search Report issued in PCT/EP2017/067115, dated Oct. 27, 2017.

*Primary Examiner* — Jorge L Leon, Jr.
(74) *Attorney, Agent, or Firm* — thyssenkrupp North America, Inc.

(57) ABSTRACT

An assembly aid configured to fix the rotational position of rotatably mounted shafts. The assembly aid has at least two parallel mandrels which are connected to one another by way of a bridge, each mandrel being assigned a positioning element which is arranged at least in sections eccentrically with respect to the respective mandrel.

15 Claims, 5 Drawing Sheets

(51) Int. Cl.
 *B25B 27/00* (2006.01)
 *F01L 1/053* (2006.01)
(58) Field of Classification Search
 USPC .................................................. 123/90.27
 See application file for complete search history.

(56) References Cited

U.S. PATENT DOCUMENTS

2011/0197411 A1    8/2011  Huang
2012/0073533 A1*   3/2012  Hamada ................. F01L 1/053
                                                     123/90.27

FOREIGN PATENT DOCUMENTS

DE  10 2010 017 728 A    7/2011
DE  10 2014 104 995 A   10/2015
DE  10 2005 020 236 B    2/2016
GB       2 381 563 A    5/2003

* cited by examiner

ASSEMBLY AID, CAMSHAFT MODULE, AND METHOD FOR FIXING THE ROTATIONAL POSITION OF ROTATABLY MOUNTED SHAFTS

CROSS REFERENCE TO RELATED APPLICATIONS

This application is a U.S. National Stage Entry of International Patent Application Serial Number PCT/EP2017/067115, filed July 7, 2017, which claims priority to German Patent Application No. DE 10 2016 112 994.1, filed July 14, 2016, the entire contents of both of which are incorporated herein by reference.

FIELD The present disclosure generally relates to an assembly aid for fixing the rotational position of rotatably mounted shafts.

A module with a pre-oriented camshaft is known from DE 10 2014 104 995 A1. The module consists of a protective cover which is suitable for placing onto a cylinder head. The cover has two bores, from which the camshafts protrude. Furthermore, the cover has a receptacle in the form of a securing bore, in order to receive a securing part. The securing part is pushed into the receptacle and engages through a further recess in the camshaft sprocket and therefore secures the camshaft against rotation.

DE 38 32 812 A1 discloses an apparatus for setting the control times on an internal combustion engine, the camshaft of which is driven via a toothed belt, a chain or else a gearwheel drive. In order to set the control times, setting pins engage into the camshafts or crankshafts, in order to hold them in a defined position. The setting pins are screwed into a bore on the crankcase until the tips of the setting pins engage into a further bore on the camshafts or crankshafts.

The known securing elements can fix in each case only a single shaft. In addition, additional bores are required in the protective cover and/or in the crankcase. This makes it more difficult, in addition, to find the correct position of the camshafts or crankshafts for securing purposes, since the housings cover the bores in the shafts and they are visible only through the bores. It therefore cannot be verified without relatively great complexity whether the shafts are actually secured. It is a further disadvantage that each shaft has to be fixed individually, which can lead to further errors during the assembly or dismantling if, for example, a securing part is removed prematurely and the associated shaft rotates with respect to a further shaft which is still fixed.

Thus a need exists for a camshaft module an assembly aid which makes reliable and simple fixing of the rotational position of rotatably mounted shafts possible.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to an assembly aid for fixing the rotational position of rotatably mounted shafts. Furthermore, the invention relates to a camshaft module and to a method for fixing the rotational position of rotatably mounted shafts.

The invention is based on the concept of specifying an assembly aid for fixing the rotational position of rotatably mounted shafts. The assembly aid has at least two parallel mandrels which are connected to one another by way of a bridge, each mandrel being assigned a positioning element which is arranged at least in sections eccentrically with respect to the respective mandrel.

The invention has the advantage that at least two shafts, in particular camshafts, can be secured and pre-oriented at the same time by way of a single assembly aid. This ensures that the camshafts do not rotate after assembly and during transport. The camshafts can therefore already be pre-oriented at the component supplier and can be transported securely for transport to the vehicle manufacturer which does not have to also orient them for the installation. The camshafts are usually not oriented manually or in a complicated automated apparatus until immediately before the assembly with the cylinder head at the vehicle manufacturer.

It is a further advantage of the invention that the assembly aid can be pulled simply from the receiving bores after the assembly of the camshafts, and the camshafts are immediately ready for assembly. As a result, the time requirement for the assembly is reduced.

It is particularly advantageous that the assembly aid secures the camshafts among one another, that is to say by way of interaction between the camshafts. The securing does not take place by way of a connection of the camshafts to other components in the surroundings of the camshafts. As a consequence, no additional recess or bores have to be made in other components, such as the housing, which recess or bores have to be manufactured precisely, in order that they are aligned with the recesses, grooves or bores of the camshafts. Additional work steps and time requirements are saved by way of the simple assembly.

Preferred embodiments of the invention are specified in the subclaims.

In one preferred embodiment, the positioning element is arranged spaced apart radially from the mandrel. The positioning element is therefore not arranged directly on the mandrel, but rather can be arranged, for example, at the edge of a plate, in the center of which the mandrel is situated. As a result, a corresponding positioning groove of the shaft can be arranged on the outside at the shaft edge.

In a further embodiment, the positioning elements are oriented at different rotational angles with regard to the respective associated mandrel. As a consequence, the shafts can be oriented at any desired angle with respect to one another, since the positioning elements define the rotational angle of the shafts. Therefore, depending on the manufacturer specifications and/or customer requirements, the shafts can be pre-oriented at a precisely defined rotational angle and can be delivered in a state which is ready for installation.

In one particularly preferred embodiment, the mandrels of the assembly aid have a tapering tip. By way of the tapering tip, the mandrels can be introduced more easily into the end-side receiving bores of the shafts. As a result, the assembly aid can be mounted more rapidly and more simply.

In one preferred embodiment, the bridge of the assembly aid has two end segments and a connecting segment, the bridge being angled off between the connecting segment and the end segments. A spacing of the connecting segment parallel to the transverse plane of the mandrels is produced by way of the angled-off position of the segments with respect to one another. As a result, material can be saved during the production of the assembly aid.

The bridge of the assembly aid is preferably configured as a C-shaped handle. On account of this, the assembly aid can be mounted more easily, since an assembly operator can grip the bridge securely and can introduce or pull out the mandrels as a result of the handle shape.

The bridge of the assembly aid, in particular the end segments and/or the connecting segment, advantageously has reinforcing ribs. The reinforcing ribs increase the stability and rigidity of the assembly aid and therefore increase the security for transport.

In a further embodiment, a plate is configured between the bridge and the mandrel, which plate extends perpendicularly with respect to the longitudinal axis of the mandrel. The plate affords the advantage that it extends over the end-side bores of the shafts and, as a consequence, protects them against contamination. Moreover, the plate seals the receiving bores against the penetration of liquids, for example on the transport route.

The plate preferably has at least one recess, the positioning element and/or the mandrel being arranged in the recess. As a result, the positioning element can be introduced more deeply into the positioning groove of the shaft, since possible rounded portions of the positioning element with respect to the plate lie in the recess and are countersunk by way of the recess. Therefore, the plate terminates flush with the shaft and no air gap is produced, through which dirt or liquids might penetrate into the end-side receiving bores of the shafts.

A T-shaped handle is advantageously configured on a side of the plate, which side faces away from the mandrel. Said handle allows the assembly operator even more improved control during the introduction of the mandrels into the end-side receiving bores of the shafts, since the longitudinal axis of the T-shaped handle is congruent with the longitudinal axis of the mandrels. The assembly aid therefore does not tend to tilt while being pulled out. Furthermore, the T-shape provides a satisfactory grip surface.

In one preferred embodiment, the assembly aid is manufactured in one piece, in particular from plastic. This affords the advantage that the assembly aid can be manufactured in only one method step, for example in an injection molding method, such as thermoplastic injection molding, thermoset injection molding, elastomer injection molding, or else additive methods are conceivable. As a result, the assembly aid can be manufactured inexpensively in large numbers as a molded part which can be used directly, or can be manufactured in an additive manner in small numbers for specific shafts.

The assembly aid is preferably manufactured in multiple pieces, the bridge being connected releasably to the mandrels and/or to the plates. This makes it possible to push the mandrels individually into the end-side receiving bores of the shafts and to rotate them with the mandrels and a possible T-shaped handle, in order subsequently to connect the bridge in a defined manner to the mandrels and/or plates. As a result, the rotation of the shafts is facilitated for the assembly operator.

Within the context of the invention, furthermore, a camshaft module is specified with an assembly aid and two camshafts which are arranged in parallel and in each case have an end-side receiving bore and an end-side positioning groove, in each case a mandrel of the assembly aid engaging into a receiving bore and a positioning element engaging into a positioning groove in such a way that a relative rotational orientation of the camshafts with respect to one another is fixed. The camshaft module can advantageously already be assembled and pre-oriented completely at the component supplier with the aid of the assembly aid. Accordingly, the vehicle manufacturer can mount the camshaft module directly onto the cylinder head and can subsequently remove and dispose of the assembly aid. The assembly aid can also be returned to the component supplier and reused in an environmentally friendly manner.

The assembly aid is preferably manufactured from a recyclable plastic.

Furthermore, a method for fixing the rotational position of rotatably mounted shafts is claimed, the mandrels of the assembly aid being pushed into the end-side receiving bores of the camshafts, and the rotatably mounted camshafts being rotated in such a way that the positioning elements engage into the positioning grooves and the positioning elements are pushed into the positioning grooves, in particular for pre-orientation and locking for transport.

It is a particularly advantageous feature of the method that the assembly operator can orient the shafts at defined rotational angles with respect to one another by way of a few hand movements. Furthermore, the assembly aid can be removed by way of only one hand movement after the mounting of the camshaft module. This saves time and workload in comparison with the customary manual orientation of the camshafts or an automated method for orienting the camshafts at the vehicle manufacturer.

Figure 1:
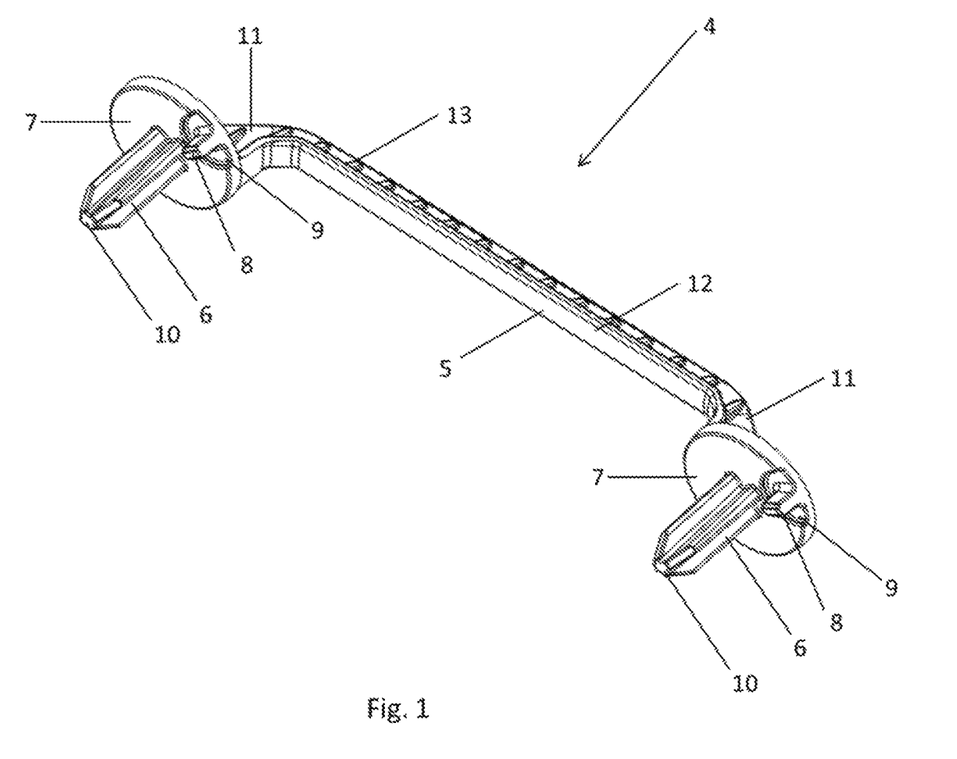
FIG. 1 is a perspective view of an assembly aid in accordance with one exemplary embodiment.
Figure 1B:
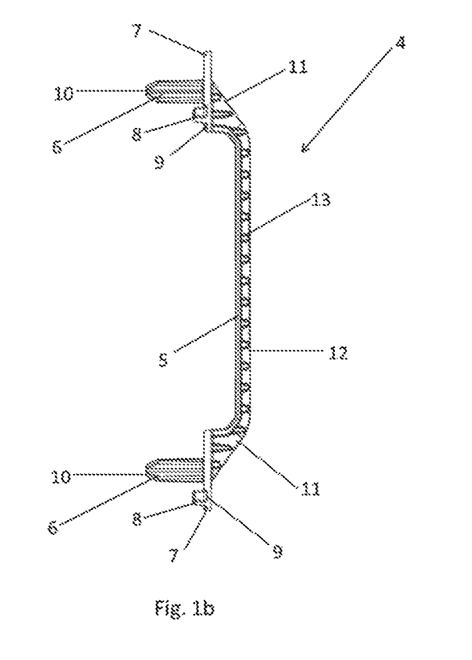
Figure 1b is a side view of the assembly aid in accordance with FIG. 1.
Figure 1C:
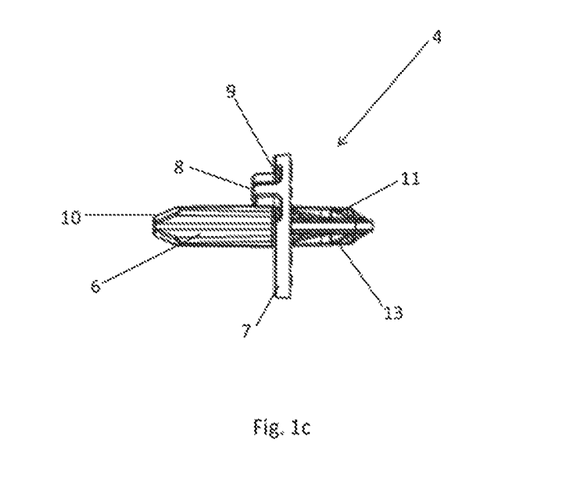
Figure 1c is a side view of the assembly aid in accordance with FIG. 1 from a different angle.

FIG. 1 shows a perspective view of an assembly aid 4 in accordance with one preferred exemplary embodiment. The assembly aid 4 can preferably be used for fixing the rotational position of rotatably mounted shafts and particularly preferably for fixing the rotational position of rotatably mounted inlet camshafts 1 and outlet camshafts 2. The assembly aid 4 has two parallel mandrels 6 which are connected to one another by way of a bridge 5, each mandrel 6 being assigned a positioning element 8 which is arranged at least in sections eccentrically with respect to the respective mandrel 6. The bridge 5 extends perpendicularly with respect to the longitudinal axis from one end of a mandrel 6 to the end of at least one further mandrel 6. The tip 10 of the mandrels 6 is shown with a tapered portion by way of example. The tapered portion of the tip 10 can be effected, for example, as a chamfer or rounded portion. The tip 10 can be flattened as shown or can taper to a point. The mandrels 6 can have different shapes. The mandrels 6 can have a cross-shaped cross section as in the exemplary embodiment. The mandrels 6 can also be configured, for example, in a cylindrical manner, in a rectangular manner or else in any other desired shape.

In each case one plate 7 which extends perpendicularly with respect to the longitudinal axis of the respective mandrel 6 is configured between the bridge 5 and the mandrels 6. Furthermore, the bridge 5 has two end segments 11 and a connecting segment 12. The end segments 11 are arranged on the plates 7 by way of example in FIG. 1 and extend away from the plates 7 parallel to the longitudinal axis of the mandrels 6. The end segments 11 can have any desired height, in order to define the spacing between the mandrels 6 or the plates 7 and the connecting segment 12. The end segments 11 are connected by way of the connecting segment 12. Furthermore, the bridge 5 is angled off between the connecting segment 12 and the end segments 11. This can be seen at the chamfers between the components. As a result, the bridge 5 is configured in a C-shaped manner as a handle. Reinforcing ribs 13 are arranged in each case by way of example on the connecting segment 12 and the end segments 11. The components can have a multiplicity of reinforcing ribs 13, as shown in the exemplary embodiment. It is possible, however, to arrange only one or else no reinforcing rib 13 on the components. Here, the reinforcing ribs 13 can be configured in any desired shape or thickness. Moreover, beads are also conceivable which contribute to the increase of the stability.

The shape of the bridge 5, in particular of the two end segments 11 and the connecting segment 12, can be selected freely. In the exemplary embodiment, the bridge 5 is configured with a web transversely with respect to the longitudinal axis of the mandrels 6, which web extends between the mandrels, and in each case one web which extends along the longitudinal axis of the mandrels 6 on the side which faces away from the mandrel 6. The webs are stabilized by way of the reinforcing ribs 13. It is likewise possible to configure the bridge 5, for example, in a cylindrical manner, rectangular manner or in any other desired shape.

Furthermore, the positioning elements 8 are arranged in each case spaced apart radially from the mandrels 6. The positioning elements 8 are spaced apart in such a way that they are configured at the edge of the plates 7. The radial position and shape of the positioning elements 8, specifically their height, width, length and/or the spacing on the plate 7 from the respective mandrel 6, conform with the respective positioning grooves 15 which are configured in the shafts, in particular camshafts. In the assembled state, the positioning elements 8 and the positioning grooves 15 form a positively locking connection. The positioning elements 8 and the positioning grooves 15 can be configured as a tongue and groove arrangement.

The positioning elements 8 are arranged in each case in a recess 9 of the plate 7.

In one exemplary embodiment (not shown), the positioning elements 8 can be arranged directly on the mandrel 6 as an alternative and can extend radially to the outside from the latter. The recess can be arranged around the positioning element 8 and around the mandrel 6.

Figure 2:
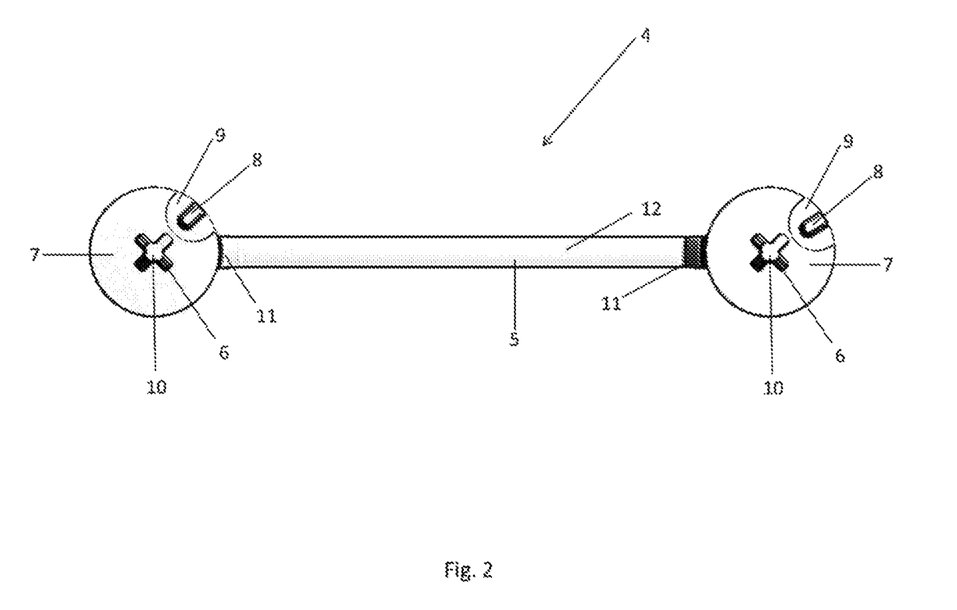
FIG. 2 is a plan view of the assembly aid in accordance with FIG. 1.

FIG. 2 is a plan view of the assembly aid 4 in accordance with FIG. 1, the mandrels 6 being shown in a plan view of the tapering tip 10. Therefore, the plates 7 extend perpendicularly with respect to the longitudinal axis of the mandrels 6 and define a plane which is shown as a circular area by way of example here. The plates 7 can be configured in a rectangular manner, in a triangular manner, in an oval manner or in any other desired shape. The positioning elements 8 which are spaced apart radially and are arranged in the recess 9 at the edge of the plates 7 are shown on the circular area of the plates 7.

As can be seen in FIG. 2, the positioning elements 8 are arranged at different angles on the circular area, which angles correspond to the pre-oriented rotational angles of the shafts.

The assembly aid 4 is configured in one piece in this exemplary embodiment. The complete assembly aid 4 can be manufactured in one method step by way of an injection molding method. For this purpose, the rounded portions are additionally provided on the assembly aid 4. It is also conceivable to manufacture the assembly aid 4 in multiple pieces in a further exemplary embodiment (not shown). For this purpose, a releasable connection is provided between the bridge 5 and the mandrels 6 and/or the plates 7. The releasable connection is designed in such a way that the bridge 5 and the mandrels 6 and/or the plates 7 can be connected at only one precisely defined angle. This ensures that the shafts can be pre-oriented exactly.

Figure 3:
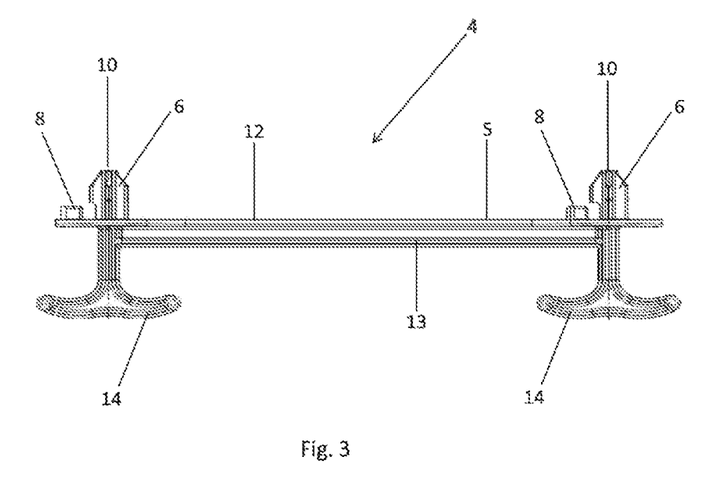
FIG. 3 is a perspective view of an assembly aid in accordance with a further exemplary embodiment.
Figure 3B:
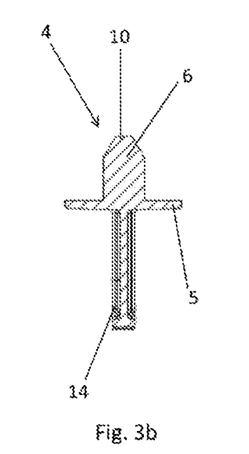
FIG. 3b is a sectional view of the assembly aid in accordance with FIG. 3.

FIG. 3 is a perspective view of an assembly aid 4 in accordance with a further exemplary embodiment, which assembly aid 4 has two parallel mandrels 6 which are connected to a bridge 5 perpendicularly with respect to their longitudinal axis in this exemplary embodiment. The positioning elements 8 are arranged spaced apart radially from each mandrel 6. On the side which faces away from the mandrel, a T-shaped handle 14 extends. The T-shape is configured from a web, the center axis of which is congruent with the longitudinal axis of the mandrels 6, and a grip surface which extends on both sides of the center axis parallel to the bridge 5 (see FIG. 3b). In this exemplary embodiment, the bridge 5 extends as a web transversely with respect to the longitudinal axis of the mandrels 6 between the T-shaped handles 14 and the mandrels 6. On the side which faces away from the mandrel, a continuous reinforcing rib 13 extends on the web of the bridge 5, which continuous reinforcing rib 13 is arranged on the webs of the T-shaped handles 14.

Figure 4:
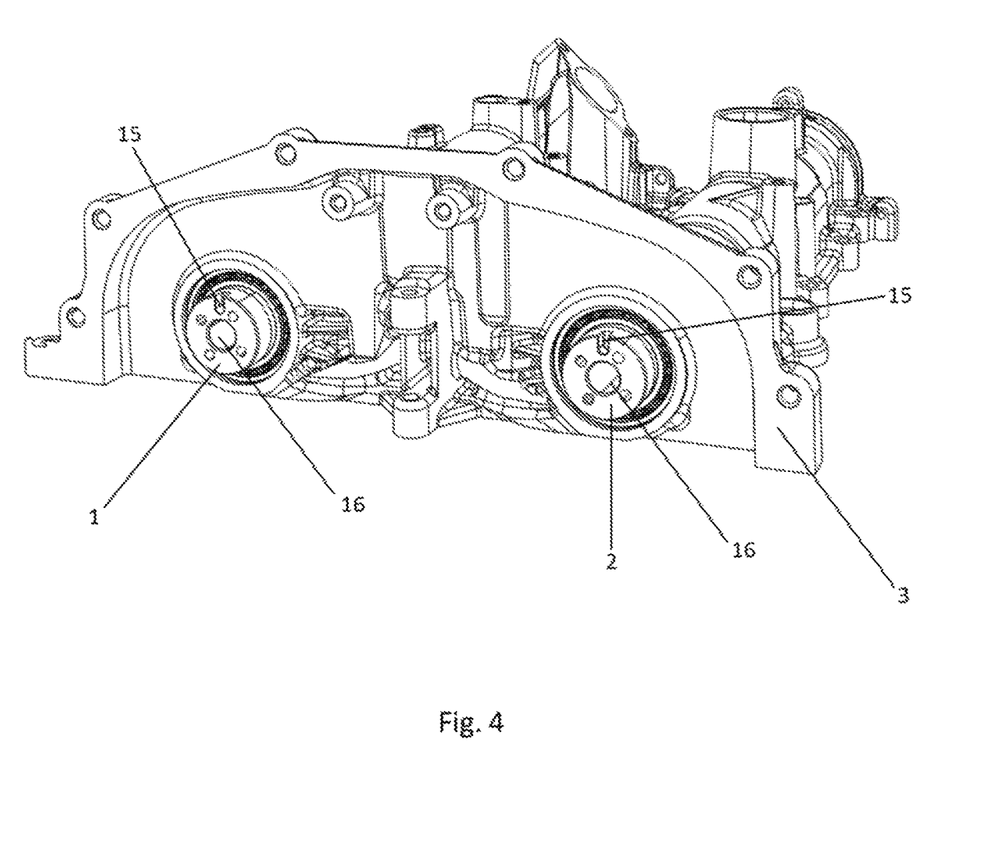
FIG. 4 is a perspective view of an inlet and outlet camshaft which can be connected to the assembly aid.

FIG. 4 shows a perspective view of an inlet camshaft 1 and an outlet camshaft 2 which are mounted in a cover 3. The camshafts are integrated into the cover 3 and are mounted rotatably. The ends of the inlet camshaft 1 and the outlet camshaft 2 protrude out of the cover 3. The positioning grooves 15 for the positioning elements 8 are shown by way of example on the outer edges at the end-side end of the camshafts. Furthermore, the end-side central receiving bores 16 of the camshafts for the mandrels 6 are shown. The positioning grooves 15 are arranged eccentrically with respect to the receiving bores 16.

As an alternative, the positioning grooves 15 can be arranged on the inside on the end-side receiving bores 16 and can extend from the latter radially to the outer edge of the shaft.

The assembly aid 4 which is shown in FIG. 1 is pushed with the two mandrels 6 into the end-side receiving bores 16 of the inlet camshaft 1 and the outlet camshaft 2. After said method step, the rotatably mounted camshafts are rotated in such a way that the positioning elements 8 engage into the positioning grooves 15. The mandrels 6 and the positioning elements 8 are pushed into the end-side receiving bores 16 of the camshafts to such an extent that the plates 7 terminate flush with the shaft ends. After this step, the positioning elements 8 and the positioning grooves 15 form a positively locking connection. As a consequence, the shafts are pre-oriented and secured for transport.

LIST OF DESIGNATIONS

1 Inlet camshaft
2 Outlet camshaft
3 Cover
4 Assembly aid
5 Bridge
6 Mandrel
7 Plate
8 Positioning element
9 Recess
10 Tip
11 End segment
12 Connecting segment
13 Reinforcing rib
14 T-shaped handle
15 Positioning groove
16 End-side receiving bore

What is claimed is:

1. An assembly aid comprising:
    two mandrels that are parallel to each other;
    a bridge interconnecting the two mandrels; and
    a first positioning element disposed adjacent to and eccentrically with respect to a first mandrel of the two mandrels and a second positioning element disposed adjacent to and arranged eccentrically with respect to a second mandrel of the two mandrels wherein the first mandrel and the first positioning element are configured to axially engage and fix a rotational position of a first camshaft and the second mandrel and the second positioning element are configured to axially engage and fix a rotational position of a second camshaft.

2. The assembly aid of claim 1, wherein the first positioning element is arranged radially spaced apart from the first mandrel and the second positioning element is arranged radially spaced apart from the second mandrel.

3. The assembly aid of claim 1, wherein the first positioning element is oriented at a first rotational angle relative to the first mandrel and the second positioning element is oriented at a second rotational angle relative to the second mandrel, wherein the first rotational angle is different than the second rotational angle.

4. The assembly aid of claim 1, wherein the two mandrels each have a tapering tip.

5. The assembly aid of claim 1, wherein the bridge has two end segments and a connecting segment connecting the two end segments.

6. The assembly aid of claim 1, wherein the bridge is configured as a C-shaped handle.

7. The assembly aid of claim 1, wherein the bridge has at least one reinforcing rib.

8. The assembly aid of claim 1, wherein a first plate is disposed between the bridge and the first mandrel and a second plate is disposed between the bridge and the second.

9. The assembly aid of claim 8, wherein the first plate has a recess comprising one or both of the first positioning element and the first mandrel and the second plate has a recess comprising one or both of the second positioning element and the second mandrel.

10. The assembly aid of claim 8, wherein the first plate and the second plate each include a T-shaped handle.

11. The assembly aid of claim 1, wherein the assembly aid is of one-piece construction.

12. The assembly aid of claim 11, wherein the assembly aid is plastic.

13. The assembly aid of claim 1, wherein the assembly aid is manufactured in multiple pieces.

14. A camshaft module comprising the assembly aid of claim 1, wherein the first camshaft and the second camshaft each have camshaft an end-side receiving bore and an end-side positioning groove, each end-side receiving bore configured to receive a respective one of the two mandrels and each end-side positioning groove configured to engage with a respective one of the first positioning element and the second positioning element so as to fix the rotational position of the first and second camshafts with respect to one another.

15. A method for fixing rotatably mounted camshafts into a rotational position, the method comprising:
    providing an assembly aid comprising:
    two mandrels that are parallel to each other;
    a bridge interconnecting the two mandrels; and
    a first positioning element disposed adjacent to and eccentrically with respect to a first mandrel of the two mandrels and a second positioning element disposed adjacent to and arranged eccentrically with respect to a second mandrel of the two mandrels wherein the first mandrel and the first positioning element are configured to axially engage and fix a rotational position of a first camshaft and the second mandrel and the second positioning element are configured to axially engage and fix a rotational position of a second camshaft;
    inserting axially the first mandrel of the assembly aid into an end-side receiving bore of the first camshaft and inserting axially the second mandrel into an end-side receiving bore of the second camshaft,
    rotating the first camshaft and the second camshaft, and
    engaging axially the first positioning element into a positioning groove of the first camshaft and engaging axially the second positioning element into a positioning groove of the second camshaft.

* * * * *